US012714008B2

(12) United States Patent
Li et al.

(10) Patent No.: US 12,714,008 B2
(45) Date of Patent: Aug. 25, 2026

(54) AERATION TYPE VARIABLE-RATE FERTILIZATION SCARIFIER FOR TEA GARDEN

(71) Applicant: Tea Research Institute, Chinese Academy of Agricultural Sciences, Hangzhou City (CN)

(72) Inventors: Yang Li, Hangzhou City (CN); Chunwang Dong, Hangzhou City (CN); Zhiyong Gui, Hangzhou City (CN); Xiaoyun Wen, Hangzhou City (CN); Feng Zhao, Hangzhou City (CN)

( * ) Notice: Subject to any disclaimer, the term of this patent is extended or adjusted under 35 U.S.C. 154(b) by 290 days.

(21) Appl. No.: 18/392,397

(22) Filed: Dec. 21, 2023

(65) Prior Publication Data

US 2025/0204304 A1 Jun. 26, 2025

(51) Int. Cl.
*A01C 21/00* (2006.01)
*A01C 15/00* (2006.01)

(52) U.S. Cl.
CPC ............ *A01C 21/002* (2013.01); *A01C 15/00* (2013.01); *A01C 21/007* (2013.01)

(58) Field of Classification Search
CPC ... A01C 21/002; A01C 21/007; A01C 23/023; A01C 23/026
USPC .... 111/118–126; 405/128.1, 128.15, 128.45, 405/128.5, 128.75, 128.7
See application file for complete search history.

(56) References Cited

U.S. PATENT DOCUMENTS 2,988,025 A * 6/1961 Johnston .............. A01C 23/025 239/172
3,029,756 A * 4/1962 Krivda .................. A01B 79/00 175/21
3,136,274 A * 6/1964 Townsend ........... A01B 45/023 111/31
3,397,542 A * 8/1968 Moulden .................. E02D 3/12 175/21
3,926,131 A * 12/1975 Collins ................ A01C 23/026 111/128
4,570,553 A * 2/1986 Ito ........................... E01C 23/12 405/269

(Continued)

*Primary Examiner* — Tara Mayo

(57) ABSTRACT

The present disclosure relates to a gas explosion type intelligent variable-rate fertilization scarifier for a tea garden. The gas explosion type intelligent variable-rate fertilization scarifier includes a walking mechanism, a fertilization-scarifying mechanism, a gas explosion mechanism, a solid fertilizer supply mechanism, and a water fertilizer supply mechanism. The fertilization-scarifying mechanism includes a transmission assembly, a detection assembly, and a fertilization-scarifying assembly. A first fertilizer conveying pipeline is fixedly connected between the solid fertilizer supply mechanism and the fertilization-scarifying assembly, and a second fertilizer conveying pipeline is fixedly connected between the water fertilizer supply mechanism and the fertilization-scarifying assembly. Each of the first fertilizer conveying pipeline and the second fertilizer conveying pipeline is provided with a solenoid valve. The walking mechanism, the gas explosion mechanism, the solid fertilizer supply mechanism, the water fertilizer supply mechanism, the fertilization-scarifying mechanism and the solenoid valves are all electrically connected to a same controller.

10 Claims, 9 Drawing Sheets

(56) References Cited

U.S. PATENT DOCUMENTS

| | | | | |
|---|---|---|---|---|
| 5,115,750 | A * | 5/1992 | White et al. | A01B 45/023<br>172/21 |
| 5,370,069 | A * | 12/1994 | Monroe | A01C 23/025<br>172/21 |
| 5,802,996 | A * | 9/1998 | Baxter | A01C 23/026<br>172/21 |
| 6,269,757 | B1 * | 8/2001 | Kiest | A01C 23/024<br>111/119 |
| 7,255,049 | B2 * | 8/2007 | Allan et al. | A01C 23/02<br>111/123 |
| 2005/0284348 | A1 * | 12/2005 | Garennes et al. | A01C 23/028<br>111/118 |

* cited by examiner

AERATION TYPE VARIABLE-RATE FERTILIZATION SCARIFIER FOR TEA GARDEN

TECHNICAL FIELD

The present disclosure belongs to the technical field of agricultural machinery, and in particular to an aeration type intelligent variable-rate fertilization scarifier for a tea garden.

BACKGROUND

Tea plants are perennial evergreen woody plants, root systems of which require a soil environment with deep soil layer, good permeability and sufficient water and fertilizer. At present, the fertilization work in tea gardens is mainly done by manual operation, leading to large workload, high labor intensity and great difficulty in fertilization. In recent years, due to the long-term neglect of soil management in tea gardens by tea farmers and the increasingly serious problem of soil hardening caused by improper fertilization, the soil permeability is poor and the utilization rate of fertilization is low, which is not conducive to the extension, growth and development of root systems of the tea plants. Therefore, there is an urgent need to improve soil by effective subsoiling and reasonable fertilization measures. The planting patterns of tea gardens in China are not uniform. The planting areas are mainly in hilly and mountainous areas, with low standardization, and foreign fertilization machinery is not suitable for planting status in China. The existing ditching fertilizing machine in China has shallow ditching depth and relatively concentrated fertilization range, which is not conducive to the full utilization of fertilizer. The conventional mechanical subsoiler requires large power and has large energy consumption. All the above models in China inevitably will destroy the soil layer structure and damage the root systems of tea plants due to soil disturbing. Therefore, there is an urgent need to develop an intelligent variable-rate fertilization scarifier for a tea garden to solve the above problems.

SUMMARY

The objective of the present disclosure is to provide an aeration type intelligent variable-rate fertilization scarifier for a tea garden, so as to solve the problems of high labor intensity and low efficiency of the existing artificial fertilization operation in tea gardens, and the problems that soil layer structures are destroyed and root systems of tea plants are damaged due to the fact that the soil is disturbed by mechanical ditching and hole digging fertilization operations.

To achieve the objective above, the present disclosure employs the following technical solution:

An aeration type intelligent variable-rate fertilization scarifier for a tea garden includes a walking mechanism, fertilization-scarifying mechanisms, an aeration mechanism, a solid fertilizer supply mechanism, and a water fertilizer supply mechanism. The fertilization-scarifying mechanisms are symmetrically arranged on both sides of the walking mechanism. Each fertilization-scarifying mechanism includes a transmission assembly, with a detection assembly and a fertilization-scarifying assembly arranged on a same end of the transmission assembly. The solid fertilizer supply mechanism, the water fertilizer supply mechanism and the aeration mechanism are arranged on the walking mechanism in sequence. A first fertilizer conveying pipeline is fixedly connected between the solid fertilizer supply mechanism and the fertilization-scarifying assembly, and a second fertilizer conveying pipeline is fixedly connected between the water fertilizer supply mechanism and the fertilization-scarifying assembly. Each of the first fertilizer conveying pipeline and the second fertilizer conveying pipeline is provided with a solenoid valve. The walking mechanism, the aeration mechanism, the solid fertilizer supply mechanism, the water fertilizer supply mechanism, the transmission assembly, the detection assembly, the fertilization-scarifying mechanism and the solenoid valves are all electrically connected to a same controller.

Further, the transmission assembly includes a fertilization scarifier housing, and a stepping motor. The stepping motor is fixedly installed at the top of the fertilization scarifier housing, a lead screw is rotatably installed in the fertilization scarifier housing, and the lead screw is connected to an output shaft of the stepping motor. A slider is connected to the lead screw in a sliding manner, slider guide rail posts are symmetrically arranged on both sides of the lead screw, and the slider guide rail posts are fixedly connected to an inner wall of the fertilization scarifier housing. Both sides of the slider are sleeved on the slider guide rail posts in a sliding manner. With such an arrangement, when the device operates, the output shaft of the stepping motor drives the lead screw to rotate, and the slider moves up and down along the slider guide rail posts with the rotation of the lead screw.

Further, the detection assembly includes a soil salinity tester, and a radar range finder. The soil salinity tester is fixedly installed on one side of the bottom of the slider, and a soil salinity tester pin is fixedly connected to the bottom of the soil salinity tester. A pin sleeve is fixedly installed on a bottom inner wall of the fertilization scarifier housing, and the radar range finder is fixedly installed on the bottom inner wall of the fertilization scarifier housing. With such an arrangement, the soil salinity tester is used to detect salt content in the soil, and the radar range finder is used to detect the depth of the fertilization inserting rod into soil.

Further, the fertilization-scarifying assembly includes a fertilization inserting rod, and a fertilization hole. The fertilization inserting rod is provided with a fertilizer inlet at a top side face, and is internally provided with a fertilizer conveying channel. The fertilization hole is provided on a bottom side face of the fertilization inserting rod, and the cross section of the fertilization hole is in the shape of a smooth funnel. An inserting rod sleeve is fixedly installed on the bottom inner wall of the fertilizing scarifier housing. Such an arrangement is used to convey fertilizer underground, and the shape of the fertilization hole accelerates the discharge speed of the fertilizer, which is convenient for the fertilizer to be scattered in the soil and beneficial for the tea plants to absorb the fertilizer.

Further, a tail end of the soil salinity tester pin is higher than the fertilization hole. With such an arrangement, when the soil salinity tester pin and the fertilization inserting rod enter the soil together, the soil salinity tester pin can be prevented from being damaged during fertilization.

Further, the aeration mechanism includes an aeration device and a gas storage tank, a gas conveying pipeline is fixedly connected between the aeration device and the gas storage tank, and an aeration pipeline is fixedly connected between the aeration device and the first pipeline. Such an arrangement is used to convey the gas.

Further, the solid fertilizer supply mechanism includes a solid fertilizer bin and a conveyor, and the conveyor is fixedly connected to one side, close to the aeration mechanism, of the solid fertilizer bin. Such an arrangement is used to convey solid fertilizer in the solid fertilizer bin out through the conveyor.

Further, the water fertilizer supply mechanism includes a water fertilizer bin and a water fertilizer temporary storage bin, and a third fertilizer conveying pipeline is fixedly connected between the water fertilizer bin and the water fertilizer temporary storage bin. Such an arrangement is used to convey water fertilizer from the water fertilizer bin to the water fertilizer temporary storage bin.

Further, a pressure pump is fixedly installed on the third fertilizer conveying pipeline, and the pressure pump is arranged on one side, close to the water fertilizer temporary storage bin, of the water fertilizer bin. With such an arrangement, the pressure pump provides power for the third fertilizer conveying pipeline and the second fertilizer conveying pipeline, and thus the water fertilizer can flow smoothly in the third fertilizer conveying pipeline and the second fertilizer conveying pipeline.

Further, the walking mechanism includes a roller and a mounting plate, and the roller is in rolling connection with the bottom of the mounting plate. Hydraulic cylinders are fixedly connected at corresponding positions on both sides of the mounting plate. A vertical connecting support is fixedly connected to each hydraulic cylinder. The vertical connecting support is fixedly connected to the corresponding fertilization-scarifying mechanism. With such an arrangement, when the device operates, the hydraulic cylinder drives the fertilization-scarifying mechanism to move up and down through the vertical connecting support, such that the bottom of the fertilization-scarifying mechanism can get close to the ground, and the stability of parts on the fertilization-scarifying mechanism inserted into the soil is greatly increased.

By adopting the technical solution, the present disclosure has the following beneficial effects:

1. Through the mutual cooperation of the roller, the mounting plate, the hydraulic cylinder and the vertical connecting support, on the one hand, the fertilization-scarifying mechanism can achieve the effect of moving fertilization and scarifying. On the other hand, the bottom of the fertilization scarifier housing can get close to the ground, so as to greatly increase the stability of the fertilization inserting rod and the soil salinity tester pin entering the soil.
2. Through the mutual cooperation of the stepping motor, the lead screw, the slider and the slider guide rail post, the fertilization-scarifying assembly can penetrate deep into the soil for fertilization and scarifying.
3. Through the mutual cooperation of the soil salinity tester, the soil salinity tester pin, the fertilization inserting rod and the radar range finder, the salt content in the soil is detected, the amount of fertilizer is determined, and the depth of the fertilization inserting rod into the soil is detected by the radar range finder.
4. Through the mutual cooperation of the gas storage tank, the aeration device, the gas conveying pipeline and the aeration pipeline, on the one hand, the fertilizer is discharged into the fertilizer conveying channel along the first fertilizer conveying pipeline, and then is discharged into the soil from the fertilizer conveying channel to complete the application of granular fertilizer. On the other hand, the aeration device can play a role of scarifying.
5. Through the mutual cooperation of the solid fertilizer bin, the conveyor, the first fertilizer conveying pipeline, the aeration pipeline, the water fertilizer bin, the water fertilizer temporary storage bin, the third fertilizer conveying pipeline, the second fertilizer conveying pipeline and the pressure pump, the solid fertilizer and the water fertilizer are conveyed to the fertilizer conveying channel for the subsequent fertilization work of the fertilization-scarifying assembly.

BRIEF DESCRIPTION OF THE DRAWINGS

The present disclosure can be further described by the non-limiting embodiments given in the accompanying drawings.

Symbols of main elements are as follows:

1—roller; 2—mounting plate; 3—hydraulic cylinder; 4—vertical connecting support; 5—fertilization-scarifying mechanism; 50—fertilization scarifier housing; 51—stepping motor; 52—lead screw; 53—slider; 54—slider guide rail post; 55—fertilization inserting rod; 551—fertilizer inlet; 552—fertilizer conveying channel; 553—fertilization hole; 56—soil salinity tester; 561—soil salinity tester pin; 57—inserting rod sleeve; 58—pin sleeve; 59—radar range finder;

6—gas storage tank; 7—aeration device; 8—gas conveying pipeline; 9—first solenoid valve; 10—solid fertilizer bin; 11—conveyor; 12—first fertilizer conveying pipeline; 13—second solenoid valve; 14—third solenoid valve; 15—aeration pipeline; 16—fourth solenoid valve; 17—water fertilizer bin; 18—water fertilizer temporary storage bin; 19—third fertilizer conveying pipeline; 20—second fertilizer conveying pipeline; 21—pressure pump; 22—fifth solenoid valve; 23—sixth solenoid valve.

DETAILED DESCRIPTION OF THE EMBODIMENTS

The present disclosure is described in detail below with reference to the accompanying drawings and specific embodiments. It needs to be noted that in the accompanying drawings or the description of the specification, the similar reference numbers are used for similar or identical parts. Implementation modes not shown or described in the accompanying drawings are known to those of ordinary skill in the art. In addition, the directional terms mentioned in the embodiment, such as "up", "down", "top", "bottom", "left", "right", "front" and "back", are only directions referring to the accompanying drawings and are not used to limit the scope of protection of the present disclosure.

As shown in FIG. 1 to FIGS. 7A-7D, an aeration type intelligent type variable-rate fertilization scarifier includes a walking mechanism, a fertilization-scarifying mechanism 5, an aeration mechanism, a solid fertilizer supply mechanism, and a water fertilizer supply mechanism. The solid fertilizer supply mechanism and the water fertilizer supply mechanism are used to achieve real-time variable-rate application of solid fertilizer and water fertilizer, respectively. The fertilization-scarifying mechanism 5 can be used to achieve the precise variable-rate fertilization and scarifying operations in a tea garden according to the soil salt content.

Figure 2:
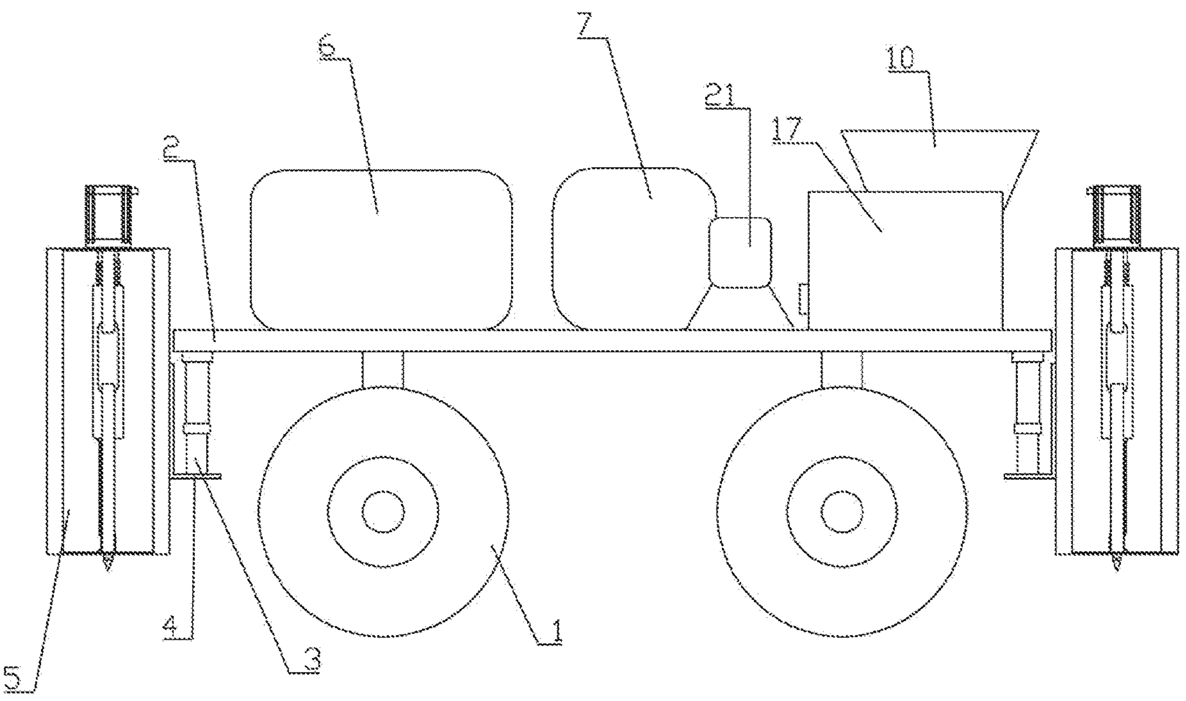
FIG. 2 is a front view of an aeration type intelligent variable-rate fertilization scarifier for a tea garden according to the present disclosure.
Figure 3:
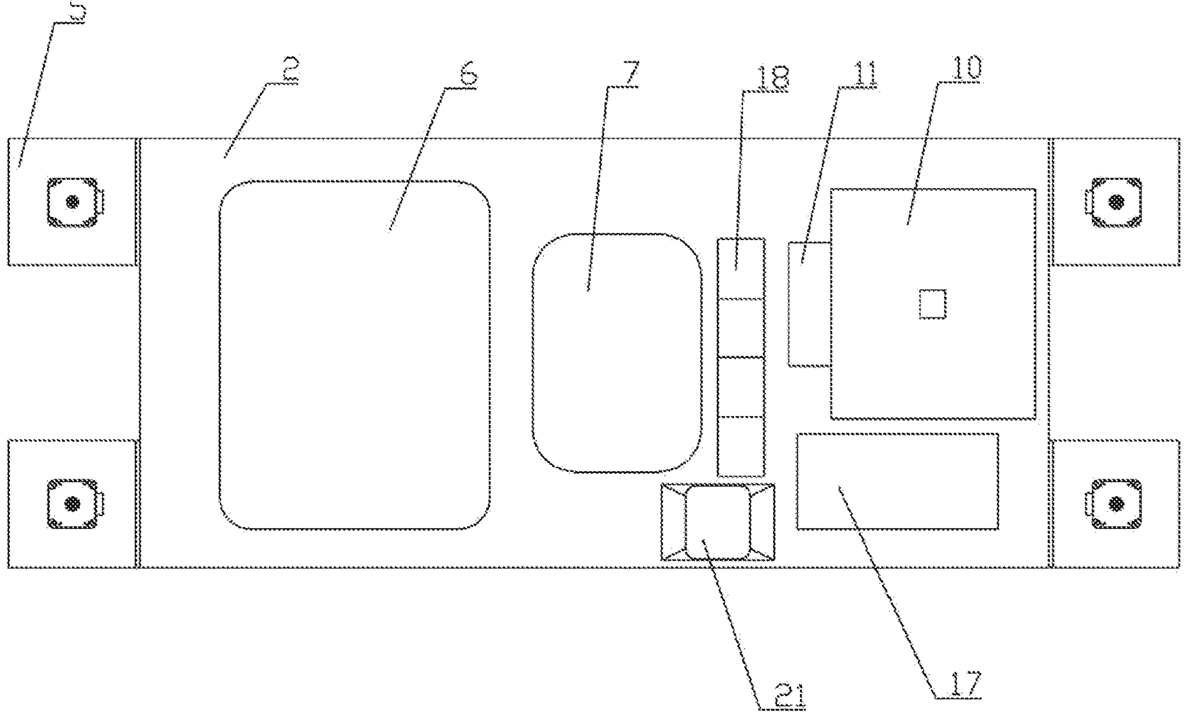
FIG. 3 is a top view of an aeration type intelligent variable-rate fertilization scarifier for a tea garden according to the present disclosure.

As shown in FIG. 2 and FIG. 3, the walking mechanism includes rollers 1 and a mounting plate 2. Multiple rollers 1 are provided, and in this embodiment, there are four rollers 1. The rollers 1 are in rolling connection with the bottom of the mounting plate 2, and the mounting plate 2 moves along with the rollers when the device operates. Multiple fertilization-scarifying mechanisms 5 are provided, and in this embodiment, there are four fertilization-scarifying mechanisms 5. The fertilization-scarifying mechanisms 5 are symmetrically arranged on both sides of the mounting plate 2 in pairs, and hydraulic cylinders 3 are fixedly connected at corresponding positions on both sides of the mounting plate 2. Multiple hydraulic cylinders 3 are provided, and in this embodiment, there are four hydraulic cylinders 3. A vertical connecting support 4 is fixedly connected to each of the hydraulic cylinders 3, and the vertical connecting support 4 is fixedly connected to the corresponding fertilization-scarifying mechanism 5. When the device operates, the hydraulic cylinder 3 drives the fertilization-scarifying mechanism 5 to move up and down through the vertical connecting support 4, such that the bottom of the fertilization-scarifying mechanism 5 can get close to the ground, so as to greatly enhance the stability of the parts on the fertilization-scarifying mechanism 5 inserted into the soil. When the device operates, the mounting plate 2 drives the fertilization-scarifying mechanism 5 to move due to the movement of the rollers 1, thus achieving the effect of moving fertilization.

Figure 4:
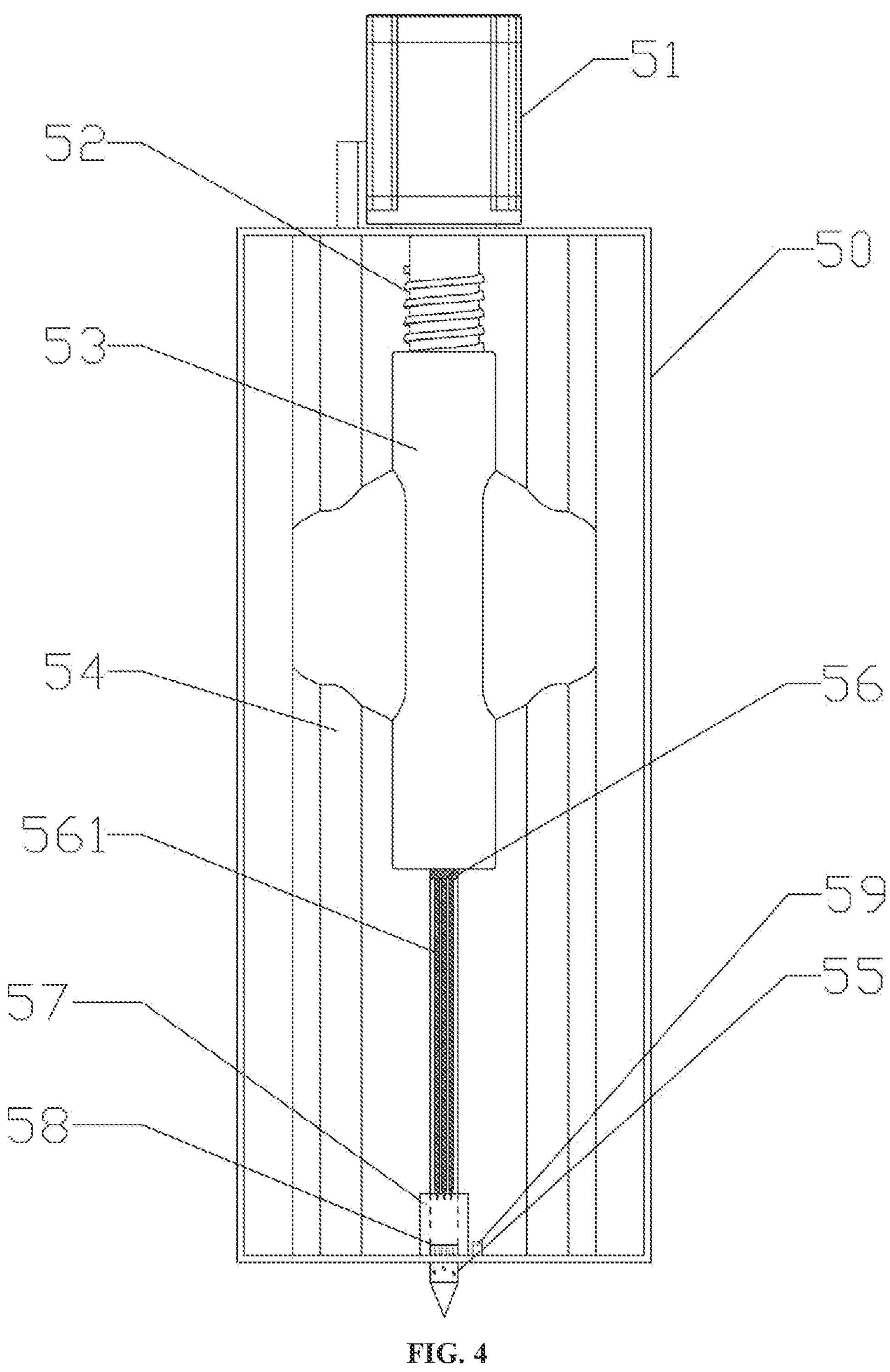
FIG. 4 is a front view of a fertilization-scarifying mechanism of an aeration type intelligent variable-rate fertilization scarifier for a tea garden according to the present disclosure.
Figure 5:
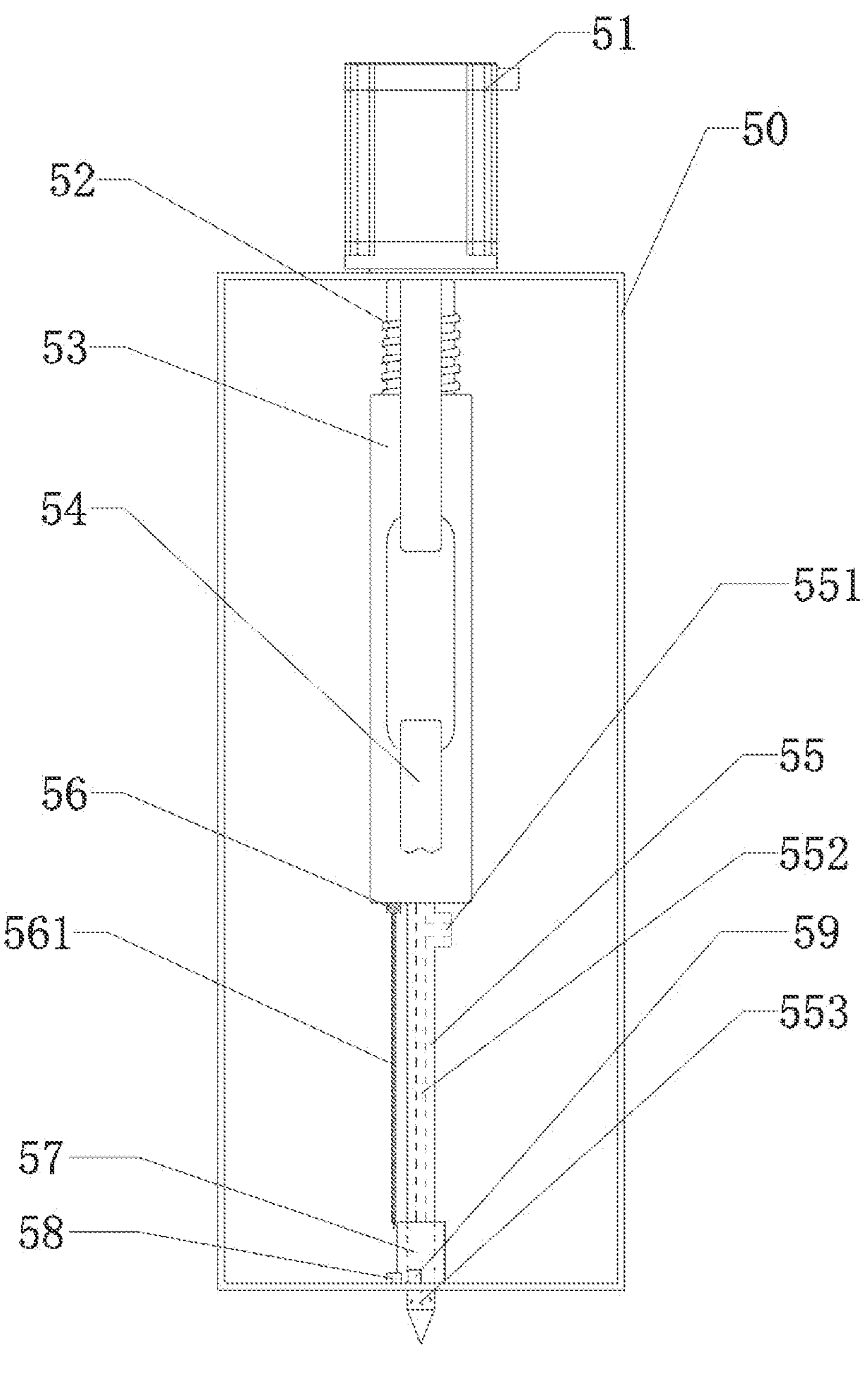
FIG. 5 is a right view of a fertilization-scarifying mechanism of an aeration type intelligent variable-rate fertilization scarifier for tea garden according to the present disclosure.
Figure 6:
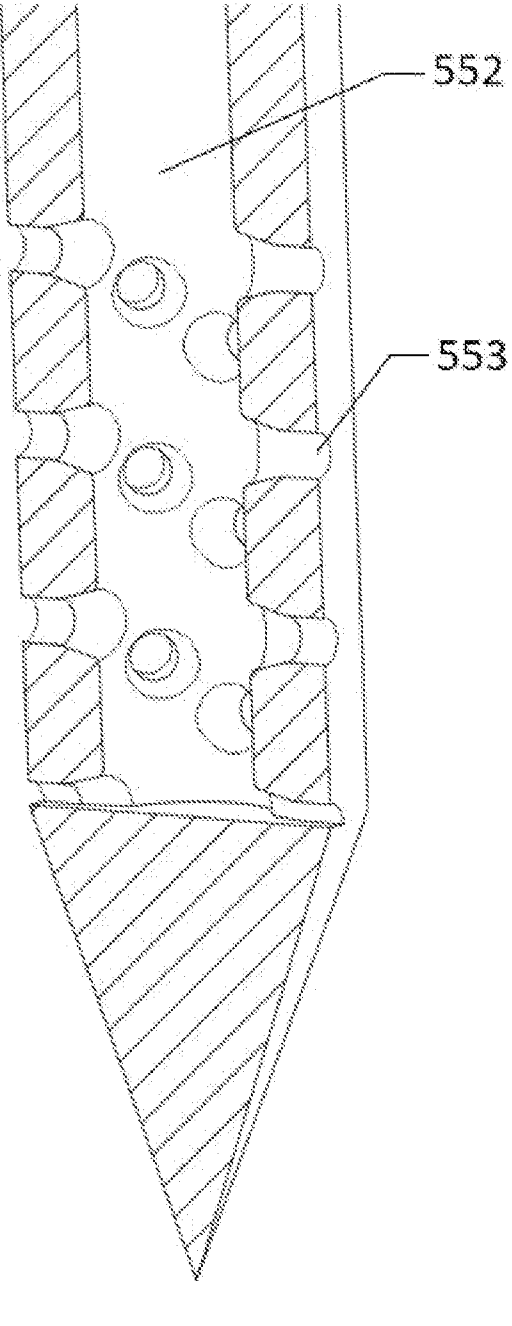
FIG. 6 is a schematic diagram of a three-dimensional structure of the cross section of a fertilization inserting rod in an aeration type intelligent variable-rate fertilization scarifier for a tea garden according to the present disclosure.

As shown in FIG. 4 to FIG. 5, the fertilization-scarifying mechanism 5 includes a transmission assembly, and the transmission assembly includes a fertilization scarifier housing 50, and a stepping motor 51. The stepping motor 51 is fixedly installed at the top of the fertilization scarifier housing 50, a lead screw 52 is rotatably installed in the fertilization scarifier housing 50, and the lead screw 52 is connected to an output shaft of the stepping motor 51. In this embodiment, the lead screw 52 is connected to the output shaft of the stepping motor 51 by a coupling. A slider 53 is connected to the lead screw 52 in a sliding manner, slider guide rail posts 54 are symmetrically arranged on both sides of the lead screw 52, and the slider guide rail posts 54 are fixedly connected to the inner wall of the fertilization scarifier housing 50. Both sides of the slider 53 are sleeved on the slider guide rail posts 54 in a sliding manner. When the device operates, the output shaft of the stepping motor 51 drives the lead screw 52 to rotate, and the slider 53 moves up and down along the slider guide rail posts 54 with the rotation of the lead screw 52.

A detection assembly and a fertilization-scarifying assembly are arranged at one end of the transmission assembly. The detection assembly includes a soil salinity tester 56, and a radar range finder 59. The soil salinity tester 56 is fixedly installed at one side of the bottom of the slider 53. The fertilization-scarifying assembly includes a fertilization inserting rod 55 and a fertilization hole 553. The fertilization inserting rod 55 is fixedly connected to the center of the bottom of the slider 53. When the device operates, the lead screw 52 operates stably, and the transmission action force is enough for the fertilization inserting rod 55 and a soil salinity tester pin 561 to enter the soil, and then corresponding amount of fertilizer can be applied to a position according to detection data of the soil salinity tester 56, thus achieving the effect of variable-rate fertilization. The soil salinity tester pin 561 is fixedly connected to the soil salinity tester 56, and both the fertilization inserting rod 55 and the soil salinity tester pin 561 move up and down with the slider 53.

Figure 7A:
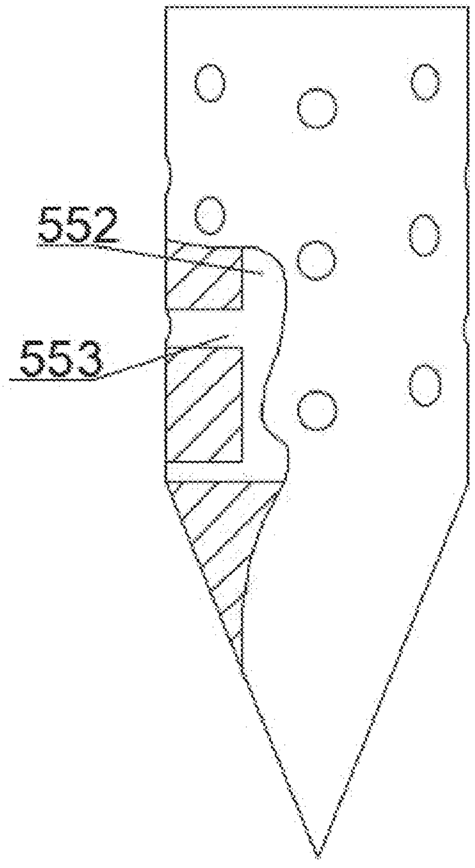
FIG. 7A, FIG. 7B, FIG. 7C, and FIG. 7D are structural schematic diagrams of a fertilization hole of an aeration type intelligent variable-rate fertilization scarifier for a tea garden according to the present disclosure.
Figure 7B:
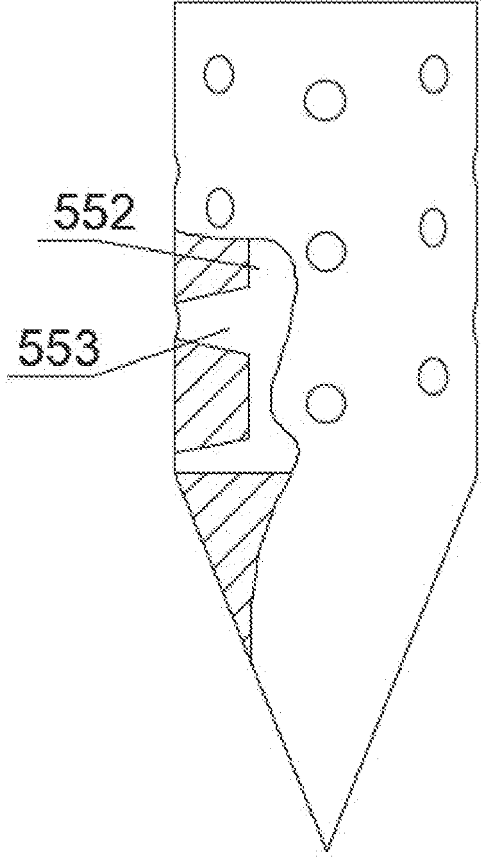
Figure 7C:
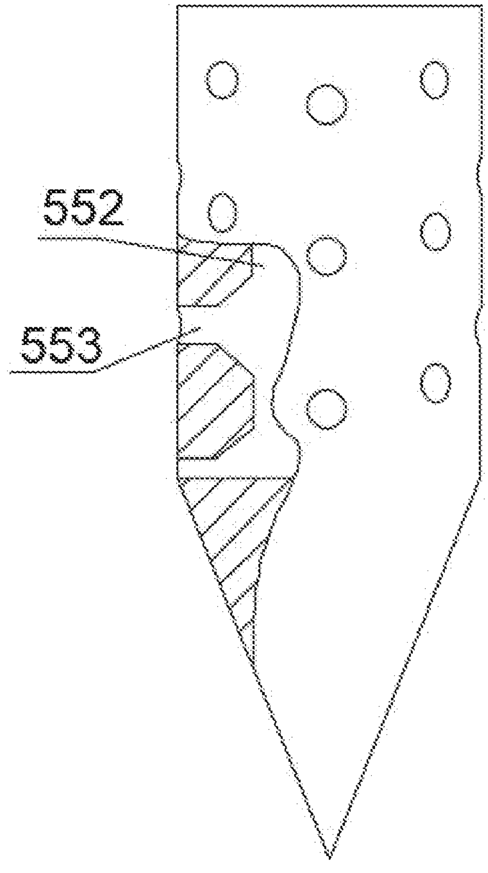
Figure 7D:
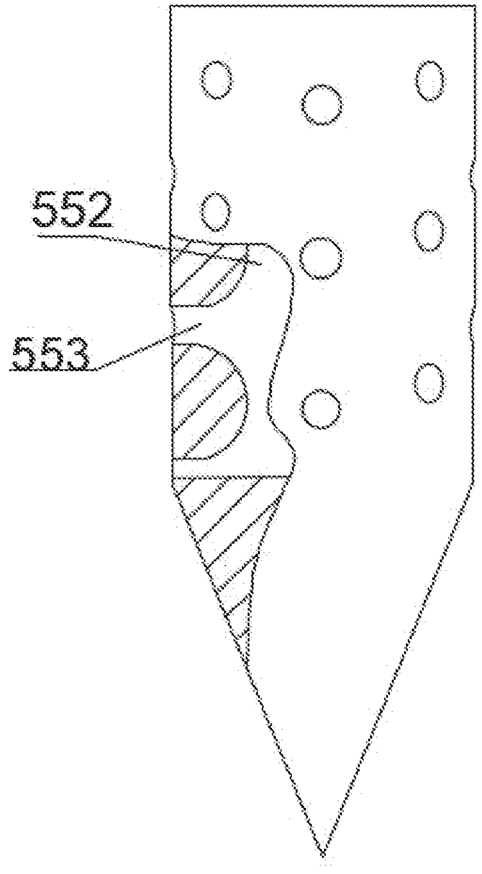

As shown in FIG. 5 to FIGS. 7A-7D, the fertilization inserting rod 55 is provided with a fertilizer inlet 551 at a top side face, and is internally provided with a fertilizer conveying channel 552. The fertilization hole 553 is provided on the bottom side face of the fertilization inserting rod 55, and the bottom of the fertilization inserting rod 55 is of a solid conical structure, which is beneficial to the discharge of fertilizer and can prevent the fertilizer from accumulating at the bottom to cause blockage. As shown in FIGS. 7A-7D, the fertilization holes 553 are evenly distributed in the form of a spiral on the inserting rod from top to bottom, and have four shapes for selection: Scheme (1) (FIG. 7A) The fertilization hole is a cylindrical hole, which is suitable for discharging liquid fertilizer, but is not beneficial to the discharge of solid fertilizer and is easy to cause blockage at an outlet. Scheme (2) (FIG. 7B) The fertilization hole is a frustum-shaped hole, which is beneficial to the discharge of solid fertilizer and liquid fertilizer. Scheme (3) (FIG. 7C) The fertilization hole is formed by connecting a cylindrical hole with a frustum-shaped hole, and in this scheme, there is no curved surface transition at the joint, so the resistance in the process of fertilizer discharge is great. Scheme (4) (FIG. 7D) The fertilization hole is formed by connecting a cylindrical hole with a curved hole, and the joint of the curved hole and the cylindrical hole is in smooth transition, and the joint with the fertilizer conveying channel 552 inside the fertilization inserting rod 55 is in smooth transition, such that soil particles can be effectively inhibited from entering the fertilizer conveying channel 552 from the fertilization holes 553 when the fertilization inserting rod 55 enters the soil; the curved hole reduces the resistance of fertilizer discharge, and the shape of the hole changes from large to small, which accelerates the fertilizer discharge, facilitates the fertilizer to be scattered in the soil, and is beneficial for the tea plants to absorb fertilizer. In this embodiment, the fertilization hole 553 is preferably Scheme (4) (FIG. 7D). The fertilization hole 533 is formed by connecting a cylindrical hole and a curved hole, and the cross section of the fertilization hole is in the shape of a smooth funnel. A tail end of the soil salinity tester pin 561 pin is higher than a position of the fertilization hole 553 on the fertilization inserting rod 55. When the soil salinity tester pin 561 and the fertilization inserting rod 55 enter the soil together, the soil salinity tester pin 561 can be prevented from being damaged during fertilization.

As shown in FIG. 4 to FIG. 5, an inserting rod sleeve 57 and a pin sleeve 58 are fixedly installed on the bottom inner wall of the fertilization scarifier housing 50. The inserting rod sleeve 57 and the pin sleeve 58 are arranged below the fertilization inserting rod 55 and the soil salinity tester pin 561, respectively. The inserting rod sleeve 57 and the inserting sleeve 58 have the functions of stably guiding the inserting rod and the pin into the soil, and are also used to remove the soil adhered to the inserting rod and the pin when the inserting rod and the pin move upward to leave the soil. The radar range finder 59 is fixedly installed on the bottom inner wall of the fertilization scarifier housing 50. The radar range finder 59 can detect the depth of the fertilization inserting rod 55 into the soil in real time, and can achieve the real-time control of the scarifying and fertilization depth in real time when cooperating with the stepping motor 51. The depth into the soil can be manually set according to the environment. When the depth of the fertilization inserting rod 55 in the soil reaches a set value, the stepping motor 51 stops rotating.

Figure 1:
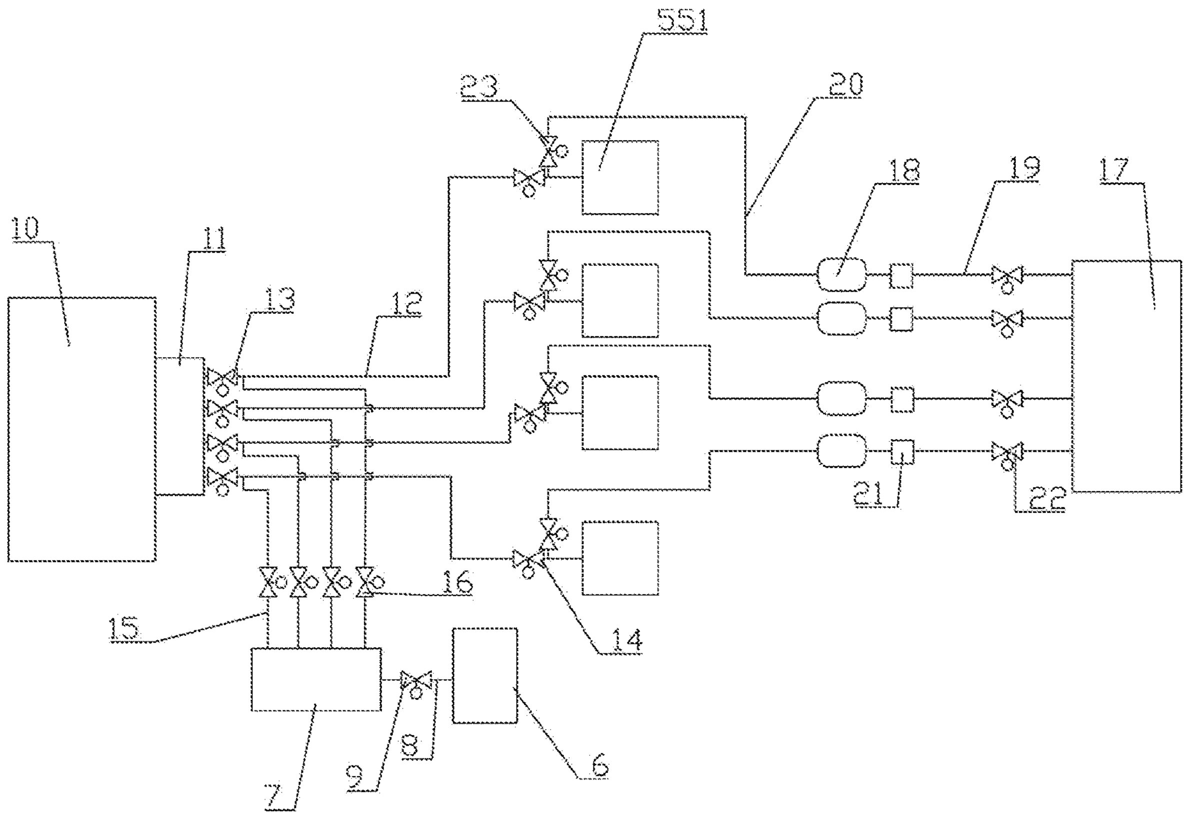
FIG. 1 is a schematic diagram of a fertilization system of an aeration type intelligent variable-rate fertilization scarifier for a tea garden according to the present disclosure.

As shown in FIG. 1 to FIG. 3, the aeration mechanism includes a gas storage tank 6 and an aeration device 7. The gas storage tank 6 is fixedly installed at a left end of the mounting plate 2, and the aeration device 7 is arranged on a right side of the gas storage tank 6. The aeration device 7 is fixedly installed on the mounting plate 2, a gas conveying pipeline 8 is fixedly connected between the gas storage tank 6 and the aeration device 7, and a first solenoid valve 9 is fixedly installed on the gas conveying pipeline 8. When the device operates, the gas content in the aeration device 7 is automatically detected. If the gas content does not reach a set value, the first solenoid valve 9 is opened, and an inert gas is conveyed from the gas storage tank 6 to the aeration device 7. After the gas content reaches the set value, the first solenoid valve 9 is closed.

As shown in FIG. 1 to FIG. 5, the solid fertilizer supply mechanism includes a solid fertilizer bin 10, and a conveyor 11. The solid fertilizer bin 10 is fixedly installed at a right end of the mounting plate 2, the conveyor 11 is fixedly connected to a left side of the solid fertilizer bin 10, and the solid fertilizer bin 10 is used for storing solid fertilizer. When the device operates, the solid fertilizer in the solid fertilizer bin 10 is conveyed out by the conveyor 11. A first fertilizer conveying pipe 12 is fixedly connected between the conveyor 11 and the fertilizer inlet 551 of each fertilization inserting rod 55. Multiple first fertilizer conveying pipelines 12 are provided, and in this embodiment, there are four first fertilizer conveying pipes 12 for conveying solid fertilizer to the fertilizer inlets 551 of the fertilization inserting rod 55, respectively. Both ends of each first fertilizer conveying pipeline 12 are provided with solenoid valves. In this embodiment, a second solenoid valve 13 is fixedly installed on an upper end of the first fertilizer conveying pipeline 12, and a third solenoid valve 14 is fixedly installed on a lower end of the first fertilizer conveying pipeline 12. When the solid granular fertilizer is applied, the second solenoid valve 13 and the third solenoid valve 14 are opened; and according to the data of the soil salinity tester 56 at each position, the conveyor 11 conveys a specified amount of fertilizer into the first fertilizer conveying pipeline 12, respectively, and the second solenoid valve 13 is closed after the conveying is completed.

The first fertilizer conveying pipeline 12 between the second solenoid valve 13 and the third solenoid valve 14 is securely connected to the aeration pipeline 15 associated with the aeration device 7. Multiple aeration pipelines 15 are provided, and in this embodiment, there are four aeration pipelines 15 for conveying gas to the first fertilizer conveying pipelines 12. A fourth solenoid valve 16 is fixedly installed on each aeration pipeline 15. After the second solenoid valve 13 is closed, the fourth solenoid valve 16 is opened, and the aeration device 7 starts aeration to discharge the fertilizer into the fertilizer conveying channel 552 through the fertilizer inlet 551 along the first fertilizer conveying pipeline 12, and then discharge the fertilizer from the fertilizer conveying channel 552 into the soil through the fertilization hole 553, so as to complete the application of granular fertilizer. Meanwhile, the aeration device 7 not only can achieve the effect of applying the solid granular fertilizer by aeration, but also can play a role of scarifying.

As shown in FIG. 1 to FIG. 3, the water fertilizer supply mechanism includes a water fertilizer bin 17, and a water fertilizer temporary storage bin 18. The water fertilizer bin 17 is fixedly installed at the right end of the mounting plate 2, the water fertilizer bin 17 and the solid fertilizer bin are arranged on one side of the mounting plate 2 side by side. The water fertilizer temporary storage bin 18 is provided between the conveyor 11 and the aeration device 7. Multiple water fertilizer temporary storage bins 18 are provided, and in this embodiment, there are four water fertilizer temporary storage bins 18, which are all fixedly connected to the mounting plate 2. The water fertilizer bin 17 is used for storing water fertilizer, and the water fertilizer temporary storage bin 18 is used for temporarily storing the water fertilizer, and then discharging the water fertilizer after the amount of the water fertilizer reaches a certain value. A third fertilizer conveying pipeline 19 is fixedly connected between the water fertilizer bin 17 and the water and fertilizer temporary storage bin 18. Multiple third fertilizer conveying pipelines 19 are provided, and in this embodiment, there are four third fertilizer conveying pipelines 19. A pressure pump 21 is fixedly installed on each third fertilizer conveying pipeline 19, and the pressure pump 21 is arranged on a left side of the water fertilizer bin 17. The pressure pump 21 is fixedly installed on the mounting plate 2 to provide power for the third fertilizer conveying pipeline 19, such that the water fertilizer can smoothly flow in the third fertilizer conveying pipeline 19.

As shown in FIG. 1 to FIG. 5, a fifth solenoid valve 22 is fixedly installed at a lower end of the third fertilizer conveying pipeline 19, and the water fertilizer temporary storage bin 18 is fixedly connected to a second fertilizer conveying pipeline 20. Multiple second fertilizer conveying pipelines 20 are provided, and in this embodiment, there are four second fertilizer conveying pipelines 20. A sixth solenoid valve 23 is fixedly connected to an upper end of each second fertilizer conveying pipeline 20. When the water fertilizer is applied, both the fifth solenoid valve 22 and the sixth solenoid valve 23 are opened, and the water fertilizer in the water fertilizer bin 17 enters the water fertilizer temporary storage bin 18 through the third fertilizer conveying pipeline 19 due to gravity. According to the data of the soil salinity tester 56 at each position, the corresponding fifth solenoid valve 22 is closed immediately after the amount of water fertilizer of each water fertilizer temporary storage bin 18 reaches a certain value. Then, the pressure pump 21 starts to operate to squeeze the water fertilizer from each of the four water fertilizer temporary storage bins 18 into the fertilization inserting rod 55 through the fertilizer inlet 551 along the second fertilizer conveying pipeline 20, and then to squeeze the water fertilizer from the fertilizer conveying channel 552 into the soil through the fertilization inlet 553, thus completing the application of the water fertilizer.

The second solenoid valve 13, the third solenoid valve 14, the fourth solenoid valve 16, the fifth solenoid valve 22, the sixth solenoid valve 23, the conveyor 11, the pressure pump 21, the soil salinity tester 56 and the radar range finder 59 are all electrically connected to a same control system, and the control system can accurately control the conveying amount of the fertilizer and make the fertilizer be conveyed in a correct pipeline path.

The aeration type intelligent variable-rate fertilization scarifier for a tea garden provided by the present disclosure is introduced in detail above. The description of specific embodiments is only used to help understand the method of the present disclosure and its core idea. It should be noted that, for those of ordinary skill in the art, various improvements and modifications can be made without departing from the principle of the present disclosure. Such improvements and modifications shall be regarded as falling into the scope of protection of the present disclosure.

What is claimed is:

1. An aeration type variable-rate fertilization scarifier for a tea garden, comprising a walking mechanism, fertilization-scarifying mechanisms, an aeration mechanism, a solid fertilizer supply mechanism, and a water fertilizer supply mechanism, wherein the fertilization-scarifying mechanisms are symmetrically arranged on both sides of the walking mechanism, and each fertilization-scarifying mechanism comprises a transmission assembly, and a detection assembly and a fertilization-scarifying assembly are arranged on a same end of the transmission assembly, wherein the solid fertilizer supply mechanism, the water fertilizer supply mechanism and the aeration mechanism are arranged on the walking mechanism in sequence, wherein a first fertilizer conveying pipeline is fixedly connected between the solid fertilizer supply mechanism and the fertilization-scarifying assembly, a second fertilizer conveying pipeline is fixedly connected between the water fertilizer supply mechanism and the fertilization-scarifying assembly; and each of the first fertilizer conveying pipeline and the second fertilizer conveying pipeline is provided with a solenoid valve, and wherein the walking mechanism, the aeration mechanism, the solid fertilizer supply mechanism, the water fertilizer supply mechanism, the transmission assembly, the detection assembly, the fertilization-scarifying mechanism and the solenoid valves are all electrically connected to a same controller.

2. The aeration type variable-rate fertilization scarifier for a tea garden according to claim 1, wherein the transmission assembly comprises a fertilization scarifier housing, and a stepping motor; the stepping motor is fixedly installed at the top of the fertilization scarifier housing, a lead screw is rotatably installed in the fertilization scarifier housing, and the lead screw is connected to an output shaft of the stepping motor; a slider is connected to the lead screw in a sliding manner, slider guide rail posts are symmetrically arranged on both sides of the lead screw, and the slider guide rail posts are fixedly connected to an inner wall of the fertilization scarifier housing; and both sides of the slider are sleeved on the slider guide rail posts in a sliding manner.

3. The aeration type variable-rate fertilization scarifier for a tea garden according to claim 2, wherein the detection assembly comprises a soil salinity tester, and a radar range finder; the soil salinity tester is fixedly installed on one side of the bottom of the slider, and a soil salinity tester pin is fixedly connected to the bottom of the soil salinity tester; a pin sleeve is fixedly installed on a bottom inner wall of the fertilization scarifier housing, and the radar range finder is fixedly installed on the bottom inner wall of the fertilization scarifier housing.

4. The aeration type variable-rate fertilization scarifier for a tea garden according to claim 3, wherein the fertilization-scarifying assembly comprises a fertilization inserting rod, and a fertilization hole; the fertilization inserting rod is provided with a fertilizer inlet at a top side face, and is internally provided with a fertilizer conveying channel; the fertilization hole is provided on a bottom side face of the fertilization inserting rod, and the cross section of the fertilization hole is in the shape of a funnel; and an inserting rod sleeve is fixedly installed on the bottom inner wall of the fertilization scarifier housing.

5. The aeration type variable-rate fertilization scarifier for a tea garden according to claim 4, wherein a tail end of the soil salinity tester pin is higher than the fertilization hole.

6. The aeration type variable-rate fertilization scarifier for a tea garden according to claim 1, wherein the aeration mechanism comprises an aeration device and a gas storage tank; a gas conveying pipeline is fixedly connected between the aeration device and the gas storage tank, and an aeration pipeline is fixedly connected between the aeration device and the first pipeline.

7. The aeration type variable-rate fertilization scarifier for a tea garden according to claim 1, wherein the solid fertilizer supply mechanism comprises a solid fertilizer bin and a conveyor, and the conveyor is fixedly connected to one side, close to the aeration mechanism, of the solid fertilizer bin.

8. The aeration type variable-rate fertilization scarifier for a tea garden according to claim 1, wherein the water fertilizer supply mechanism comprises a water fertilizer bin and a water fertilizer temporary storage bin; a third fertilizer conveying pipeline is fixedly connected between the water fertilizer bin and the water fertilizer temporary storage bin.

9. The aeration type variable-rate fertilization scarifier for a tea garden according to claim 8, wherein a pressure pump is fixedly installed on the third fertilizer conveying pipeline, and the pressure pump is arranged on one side, close to the water fertilizer temporary storage bin, of the water fertilizer bin.

10. The aeration type variable-rate fertilization scarifier for a tea garden according to claim 1, wherein the walking mechanism comprises a roller and a mounting plate, and the roller is rotatably connected with a bottom of the mounting plate; hydraulic cylinders are fixedly connected at corresponding positions on both sides of the mounting plate; a vertical connecting support is fixedly connected to each hydraulic cylinder; and the vertical connecting support is fixedly connected to the corresponding fertilization-scarifying mechanism.

* * * * *